(12) United States Patent
Higuchi

(10) Patent No.: US 6,867,523 B2
(45) Date of Patent: Mar. 15, 2005

(54) BRUSH MOTOR

(75) Inventor: Yoshio Higuchi, Osaka (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 10/417,324

(22) Filed: Apr. 16, 2003

(65) Prior Publication Data
US 2004/0140724 A1 Jul. 22, 2004

(30) Foreign Application Priority Data
Apr. 17, 2002 (JP) .................................... P2002-114316

(51) Int. Cl.⁷ ........................ H02K 23/66; H02K 11/00
(52) U.S. Cl. ........................ 310/154.15; 310/154.01; 310/154.25; 310/154.26; 310/67 R; 310/156.05; 310/156.06
(58) Field of Search ........................ 310/154.01, 154.25, 310/154.28, 154.31, 154.32, 233, 156.05–156.06, 67 R, 248; 318/254, 138, 139, 439, 653

(56) References Cited

U.S. PATENT DOCUMENTS

| | | | | | |
|---|---|---|---|---|---|
| 5,874,796 | A | * | 2/1999 | Petersen ................ | 310/156.45 |
| 5,895,994 | A | * | 4/1999 | Molnar et al. ............ | 310/67 R |
| 5,925,948 | A | * | 7/1999 | Matsumoto ............... | 310/67 R |
| 6,222,331 | B1 | * | 4/2001 | Blum .......................... | 318/254 |
| 6,661,142 | B2 | * | 12/2003 | Masuda .................... | 310/67 R |
| 2002/0070694 | A1 | * | 6/2002 | Blum .......................... | 318/244 |

FOREIGN PATENT DOCUMENTS

| | | | | |
|---|---|---|---|---|
| JP | 58-57284 | | 4/1983 | .......... H02K/23/58 |
| JP | 60-15431 | | 5/1985 | .......... H02K/23/66 |
| JP | 61-205277 | | 12/1986 | .......... H02K/23/66 |
| JP | 4-48145 | | 11/1992 | .......... H02K/29/14 |
| JP | 7-13420 | | 3/1995 | .......... H02K/11/00 |
| JP | 2003319630 A | * | 11/2003 | .......... H02K/11/00 |

* cited by examiner

Primary Examiner—Tran Nguyen
Assistant Examiner—J. Aguirrechea
(74) Attorney, Agent, or Firm—Osha & May, L.L.P.

(57) ABSTRACT

A brush motor has a magnetic sensor provided for detecting a change in a field magnet occurring in correspondence with a change in a rotational position of a rotor core.

5 Claims, 11 Drawing Sheets

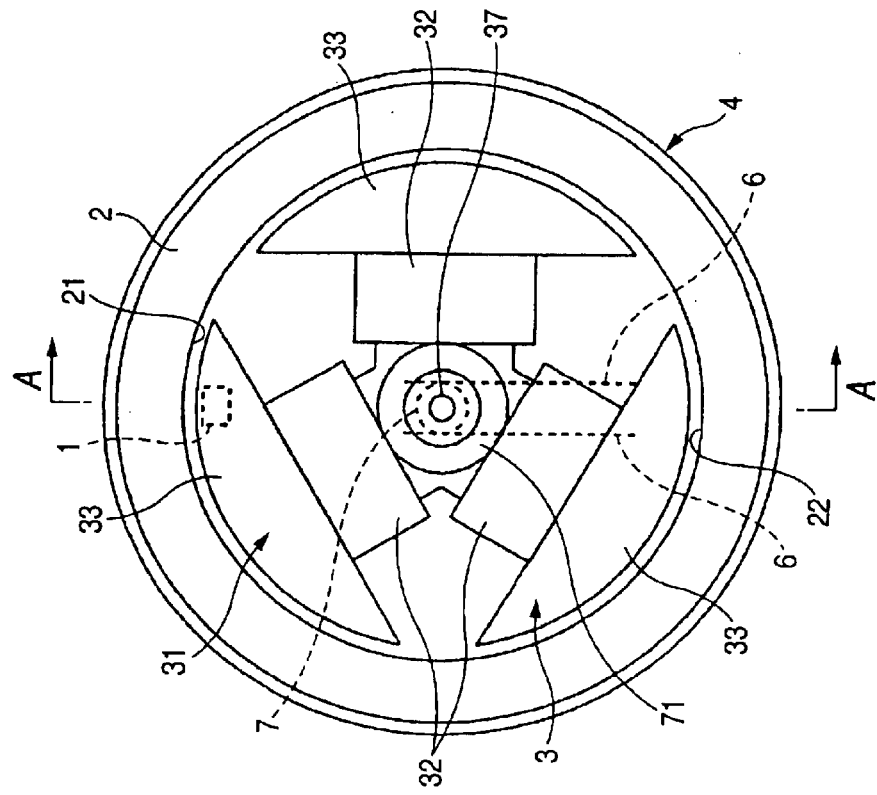
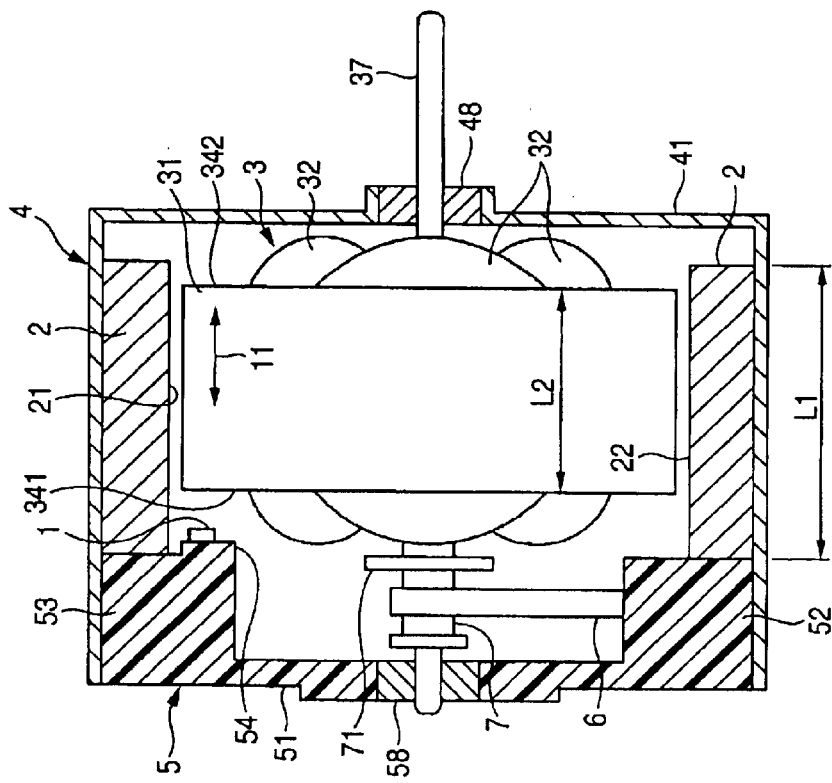

BRUSH MOTOR

The present disclosure relates to the subject matter contained in Japanese Patent Application No. 2002-114316 filed Apr. 17, 2002, which is incorporated herein by reference in its entirety.

BACKGROUND OF THE INVENTION

1. Field of the Invention

The present invention relates to a brush motor provided with a magnetic sensor for detecting a change in a field magnet that occurs in correspondence with a change in a rotational position of a rotor core.

2. Description of the Related Art

A frequency generator (hereafter referred to as FG) is used in the detection of the rotational speed of a dc motor. In the case of a brushless motor, a configuration has been proposed in which a sensor such as an FG coil for detecting the magnetic field from a rotating permanent magnet is provided (JP-UM-B-4-48145). In a brush motor, however, since the permanent magnet does not rotate, a conventional technique disclosed in JP-UM-B-7-13420 has been proposed.

Namely, in this technique, a disk-like rotating member fitted on a rotor and having a plurality of pole teeth on its outer periphery is provided. In addition, an annular disk-like stator is provided in contact with a motor housing and has a plurality of pole teeth on its inner periphery disposed in such a manner as to mutually oppose the pole teeth of the rotating member so as to overlap with the plate-like pole teeth of the rotating member. A permanent magnet for generating magnetic fields is provided between the pole teeth of the rotating member and the pole teeth of the stator. Further, a frequency detecting coil is provided for detecting a change in the magnetic field occurring between the pole tooth of the rotating member and the pole tooth of the stator. Consequently, when the rotor rotates, the magnetic resistance between the pole tooth of the rotating member and the pole tooth of the stator changes. Accordingly, since a change in the magnetic field occurs due to this change in the magnetic resistance, that change is detected by the frequency detecting coil (this technique will be referred to as the first prior art).

In addition, in the prior art proposed in JP-UM-A-58-57284 and JP-UM-B-60-15431, a rotating magnet is provided which has been magnetized into a plurality of magnetic poles and rotates integrally with a motor shaft. A change in the magnetic field occurring due to the rotation of this rotating magnet is detected by using a detection coil (this technique will be referred to as the second prior art).

In addition, in the prior art proposed in JP-UM-A-61-205277, magnetic poles are formed by magnetization on the outer periphery of a coreless armature at fine pitches. Further, a magnetic sensor is provided for detecting the magnetic field produced by each magnetic pole formed by magnetization on the outer peripheral portion of the armature. When the armature rotates, an output of a frequency proportional to the rotational speed of the armature is sent from the magnetic sensor (this technique will be referred to as the third prior art).

In addition, a conventional technique has been proposed concerning a case in which a brush motor not having a means for generating an FG signal is used. In this configuration, as shown in FIG. 14, a turntable 94 for rotatively driving a DVD is fixed to a motor shaft of a brush motor 91 mounted on a chassis 92 of a DVD reproducing apparatus. Further, a reflecting member is attached to a lower surface 941 of the turntable 94, and a reflection-type photointerrupter 95 is provided on a base plate 93. An output of the photointerrupter 95 is subjected to waveform shaping and used as an FG signal. Namely, a means for generating the FG signal is provided outside the brush motor 91 (this technique will be referred to as the fourth prior art).

The above-described first prior art requires the disk-like rotating member having a plurality of pole teeth on its outer periphery, a stator having a plurality of pole teeth on its inner periphery, a permanent magnet for forming magnetic fields between the pole teeth of the rotating member and the pole teeth of the stator, and a frequency detecting coil. For this reason, in the case where the first prior art is used, a problem has occurred in that the structure of the motor becomes complex. With the second prior art as well, since a separately provided rotating magnet is required for constructing the FG, problems have occurred in that the structure of the motor becomes complex, and that the shape becomes large in size.

In addition, the third prior art is a technique which is limited to a motor having a coreless armature. In the motor configured with a rotor core, magnetization for forming the FG cannot be directly effected on the outer periphery of the armature.

In the fourth prior art, since it is necessary to provide the photointerrupter 95 outside the brush motor 91, it is necessary to secure a gap L9 for the photointerrupter 95. Also, the base plate 93 for mounting the photointerrupter 95 is required. Consequently, since the turntable 94 must be provided at a position spaced apart from the chassis 92 by the portion of a distance L8, the turntable 94 inevitably protrudes from the chassis 92. For this reason, it has been difficult to flatten the shape of the apparatus using the brush motor 91 (DVD reproducing apparatus). (It should be noted that an arrangement may be provided such that the lower surface 941 of the turntable 94 is magnetized in a circumferentially divided fashion, and a change in the magnetic field due to this magnetization is detected by using a Hall element. However, in this case as well, the portion of the height of the Hall element and the portion of the width of the substrate 93 cause hindrances in flattering the shape of the apparatus.)

SUMMARY OF THE INVENTION

The invention has been devised to overcome the above-described problems, and its object is to provide a brush motor which makes it possible to generate FG signal without making the shape large and the structure complex, which makes it possible to increase the output level of a magnetic sensor for generating the FG signal, and which facilitates the mounting of the magnetic sensor even when the output level is increased.

Another object of the invention is to provide a brush motor which makes it possible to generate the FG signal without making the shape large and the structure complex, by detecting a change in a field magnet which occurs in correspondence with a change in a rotational position of a rotor core by using the magnetic sensor.

Still another object of the invention is to provide a brush motor which makes it possible to increase the output level of the magnetic sensor by setting the circumferentially attaching position of the magnetic sensor in the vicinity of a central position of a magnetic pole of an annular permanent magnet.

A further object of the invention is to provide a brush motor which makes it possible to further increase the output level of the magnetic sensor by causing the permanent magnet to jut out from an axial end face of the rotor core on a side where the commutator is fitted, and by setting the attaching position of the magnetic sensor on an inner peripheral side of the jutting-out portion.

A still further object of the invention is to provide a brush motor which makes it possible to make the magnetic sensor inexpensive by using a coil as the magnetic sensor.

To solve the above-described problems, in accordance with the invention there is provided a brush motor comprising: a stator having a permanent magnet for forming a field magnet; a rotor in which rotor windings are wound around a rotor core; feeding brushes; a commutator through which a current is supplied to the rotor windings, the commutator sliding on the feeding brushes; and a Hall element provided for detecting a change in the field magnet occurring in correspondence with a change in the rotational position of the rotor core, wherein the permanent magnet is formed into an annular shape whose inner peripheral surface opposes an outer peripheral surface of the rotor core, a circumferentially attaching position of the Hall element is set in the vicinity of a central position of a magnetic pole of the permanent magnet, an axial length of the permanent magnet is set to be longer than that of the rotor core, the permanent magnet is made to jut out from an axial end face of the rotor core on a side where the commutator is disposed, and the attaching position of the Hall element is set on an inner peripheral side of the jutting-out portion.

Namely, the state of the field magnet formed by the permanent magnet changes depending on the rotational position of the rotor. Accordingly, if that change is detected by using the magnetic sensor, the result of detection shows the rotational speed of the rotor. In addition, in the circumferential direction, the degree of change in the field magnet due to the rotation of the rotor is large in the vicinity of the central position of the magnetic pole of the permanent magnet, and is larger on the inner peripheral side of the jutting-out portion in the space permitting the attachment of the magnetic sensor. Further, in a case where the Hall element is formed as a chip component, the Hall element can be easily attached even in a narrow space.

In addition, in accordance with the invention there is provided a brush motor comprising: a stator having a permanent magnet for forming a field magnet; a rotor in which rotor windings are wound around a rotor core; feeding brushes; a commutator through which a current is supplied to the rotor windings, the commutator sliding on the feeding brushes; and a magnetic sensor provided for detecting a change in the field magnet occurring in correspondence with a change in the rotational position of the rotor core. Namely, the state of the field magnet formed by the permanent magnet changes depending on the rotational position of the rotor. Accordingly, if that change is detected, the result of detection shows the rotational speed of the rotor. In addition, to obtain the result of detection, it suffices if only the magnetic sensor is added.

In addition to the above-described construction, the stator may be formed by an annular permanent magnet whose inner peripheral surface opposes an outer peripheral surface of the rotor core, and a circumferentially attaching position of the magnetic sensor is set in the vicinity of a central position of a magnetic pole of the permanent magnet. Namely, in the circumferential direction, the degree of change in the field magnet due to the rotation of the rotor is large in the vicinity of the central position of the magnetic pole of the permanent magnet.

In addition to the above-described construction, the axial length of the permanent magnet may be set to be longer than that of the rotor core, the permanent magnet is made to jut out from an axial end face of the rotor core on a side where the commutator is disposed, and the attaching position of the magnetic sensor is set on an inner peripheral side of the jutting-out portion. Namely, in the circumferential direction, the degree of change in the field magnet due to the rotation of the rotor is larger on the inner peripheral side of the jutting-out portion in the space permitting the attachment of the magnetic sensor.

In addition to the above-described construction, a detection coil may be used as the magnetic sensor. Namely, the magnetic sensor can be constructed by an inexpensive element.

BRIEF DESCRIPTION OF THE DRAWINGS

FIGS. 1A and 1B are structural diagrams illustrating a first embodiment of the brush motor in accordance with the invention, in which FIG. 1B is a rear view of the brush motor, and FIG. 1A is a cross-sectional view taken along line A—A in FIG. 1B;

DETAILED DESCRIPTION OF THE PREFFERED EMBODIMENTS

Referring now to the accompanying drawings, a description will be given of an embodiment of the invention.

Figure 2:
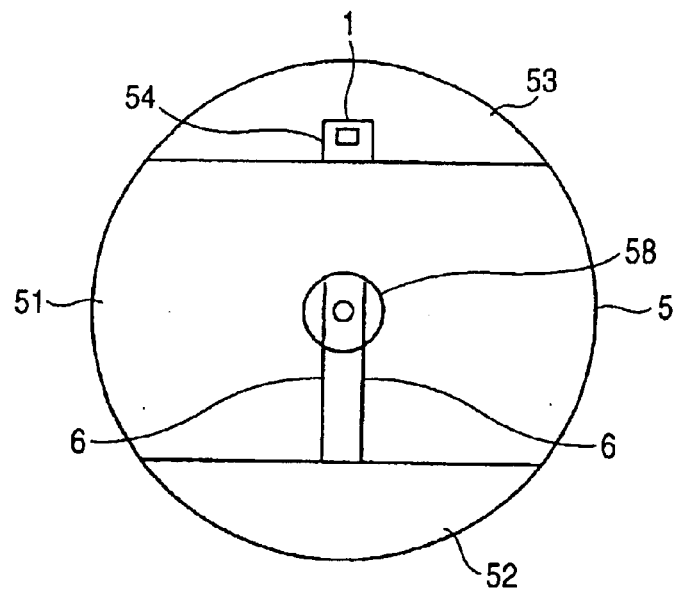
FIG. 2 is a diagram of the shape of an end bell plate as viewed from an inner side thereof.

FIGS. 1A and 1B are structural diagrams illustrating a first embodiment of the brush motor in accordance with the invention. FIG. 1B shows the shape as viewed from the rear side of the brush motor, and FIG. 1A shows a cross section taken along line A—A in FIG. 1B. In addition, FIG. 2 is a diagram of the shape of an end bell plate as viewed from the inner side.

In the drawings, an annular permanent magnet 2 for forming a field magnet is fitted to the inner periphery of a substantially cylindrical motor housing 4 whose one end portion is closed. A rotor 3 is rotatably supported by a bearing 58 provided in an end bell plate 5 and a bearing 48 provided in a disk-shaped front plate 41 of the motor housing 4. This rotor 3 has a rotor core 31 secured to a motor shaft 37, and the rotor core 31 has three arm portions 33. A rotor winding 32 is wound around each of the arm portions 33. Further, a commutator 7 is fitted on the motor shaft 37 on the end bell plate 5 side (reference numeral 71 denotes a noise eliminating element).

The end bell plate 5 is formed of a substantially disk-shaped insulating material (51) such a synthetic resin and a pair of arcuate protruding portions 52 and 53 protruding toward the inner side are formed at positions opposing each other with the bearing 58 placed there between. The arcuate protruding portion 52 on the lower side serves as a brush supporting portion for supporting two feeding brushes 6. Namely, the arrangement provided is such that an electric current is supplied to the rotor windings 32 through the commutator 7 sliding on the feeding brushes 6. Further, a projection 54 shaped in the form of a square pole and projecting toward the inside is formed on the arcuate protruding portion 53 on the upper side. A Hall element (magnetic sensor) 1 for detecting a change in the field magnet occurring in correspondence with a change in the rotational position of the rotor core 31 is attached to a distal end face of this projection 54.

It should be noted that the axial length L1 of the annular permanent magnet 2 is set to be longer than the axial length L2 of the rotor core 31. Further, the permanent magnet 2 is provided in such a manner as to jut out in the axial direction from an axial end face 341 of the rotor core 31 on the side where the commutator 7 is fitted. In addition, the permanent magnet 2 also juts out in the axial direction on the side of the other end face 342 side of the rotor core 31, but as for the jutting-out length, the end face 341 side is longer. Namely, the Hall element 1 is arranged to be located on the inner peripheral side of the jutting-out portion of which axial jutting-out length is long compared with the other side jutting-out portion of the permanent magnet 2. In addition, the direction in which the magnetic field is detected by the Hall element 1 is the axial direction, as shown by arrow 11.

Figure 3:
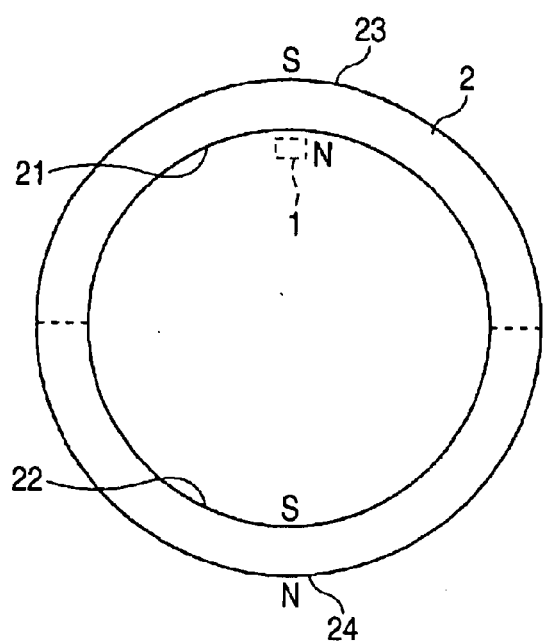
FIG. 3 is an explanatory diagram illustrating the state of magnetization of an annular permanent magnet.

It should be noted that the brush motor in this embodiment is a two-pole, three-slot brush motor. For this reason, as for the annular permanent magnet 2, one half peripheral portion 21 of the inner peripheral surface has been magnetized as the N-pole, as shown in FIG. 3. Accordingly, an outer peripheral surface 23 corresponding to the inner peripheral surface 21 forms the S-pole. Meanwhile, the other half peripheral portion 22 of the inner peripheral surface has been magnetized as the S-pole. Accordingly, an outer peripheral surface 24 corresponding to the inner peripheral surface 22 forms the N-pole. In the magnetic pole formed by mangetization on the inner peripheral surface 21, the position located in the vicinity of the Hall element 1 is a central position of the magnetic pole.

A description will be given of the operation of the first embodiment constructed as described above.

Figure 4A:
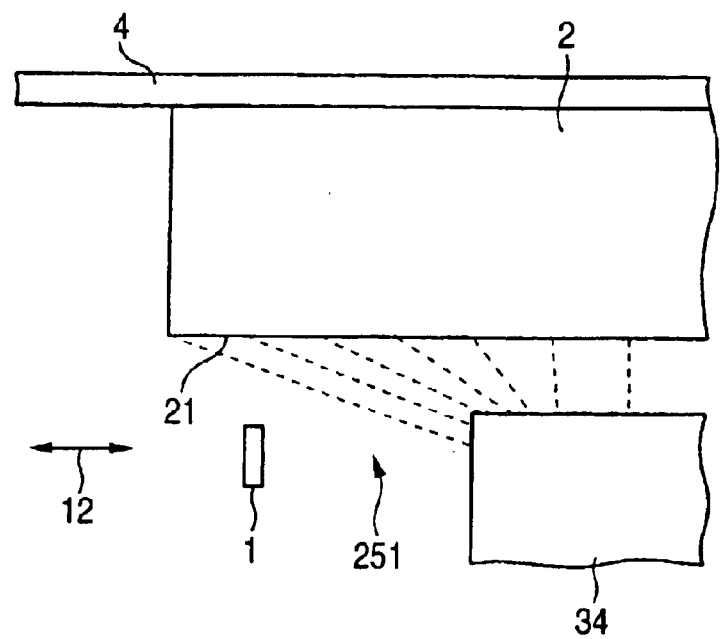
FIGS. 4A and 4B are explanatory diagrams illustrating the relationship between the rotational position of a rotor and a magnetic field in a cross section A—A.
Figure 5A:
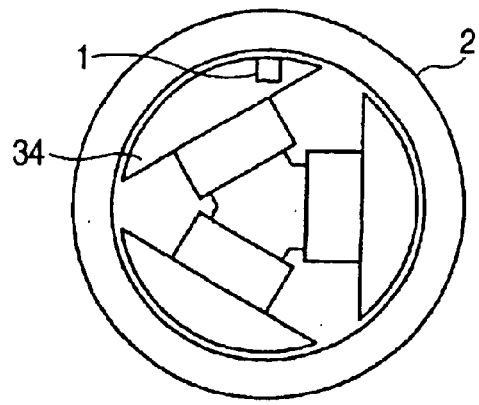
FIGS. 5A to 5C are explanatory diagrams illustrating the rotational position of the rotor.
Figure 5B:
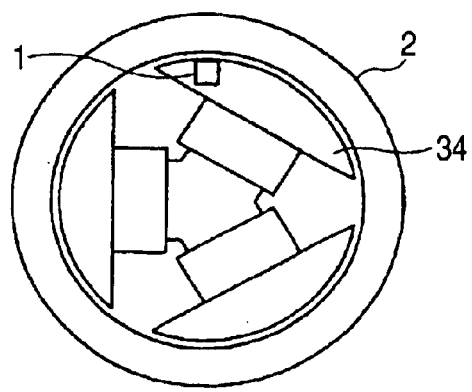

In a case where the rotational positions of the rotor 3 are those shown in FIGS. 5A and 5B, i.e., in the case where an arcuate portion 34, which is a distal end portion of the arm portion 33, is closest to the Hall element 1, a magnetic field in which magnetic lines of force run so as to connect virtually the shortest distance is formed between the inner peripheral surface 21 of the jutting-out portion of the permanent magnet 2 and the arcuate portion 34, as shown by broken lines 251 in FIG. 4A. For this reason, a strong magnetic field is not formed in the vicinity of the Hall element 1 (arrow 12 indicates the axial direction of the rotor 3, which is also the direction in which the magnetic field is detected by the Hall element 1). Accordingly, the Hall element 1 fails to detect the magnetic field.

Figure 4B:
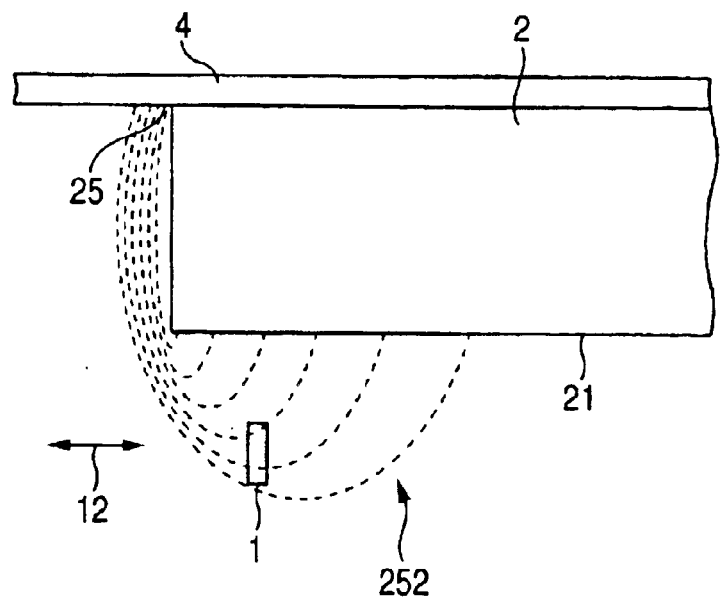
Figure 5C:
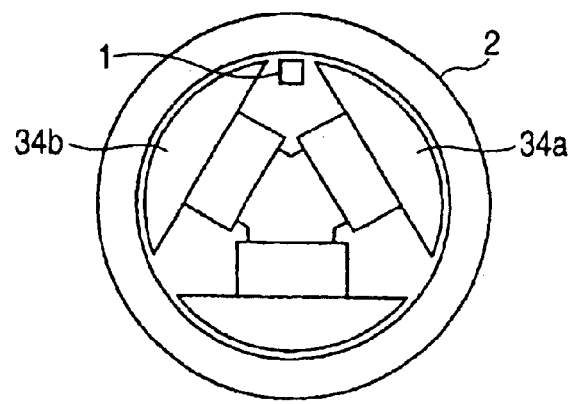

Meanwhile, in a case where the rotational position of the rotor 3 is that shown in FIG. 5C, i.e., in a case where the portion closest to the Hall element 1 is the cavity portion between an arcuate portion 34a and an arcuate portion 34b, since the outer peripheral surface 23 has been magnetized as the S-pole, a magnetic field is formed such that magnetic lines of force run between the inner peripheral surface 21 of the jutting-out portion of the permanent magnet 2 and a vicinity of the position indicated at 25, as shown by broken lines 252 in FIG. 4B. Namely, magnetic lines of force pass along the detecting direction for the Hall element 1. Consequently, the Hall element 1 detects a strong magnetic field.

Figure 6:
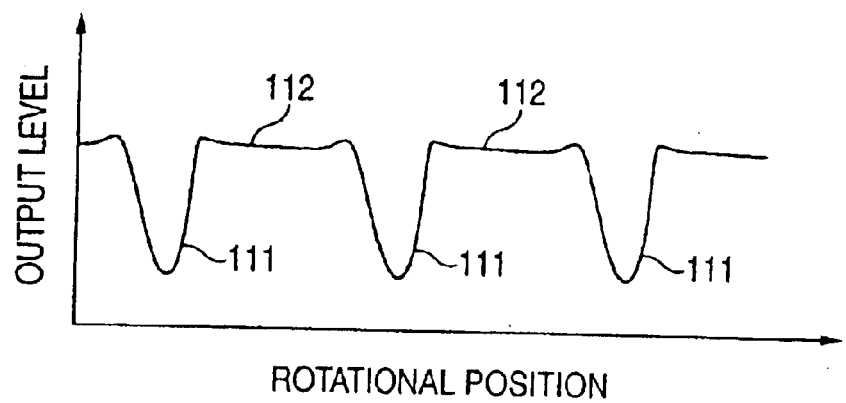
FIG. 6 is an explanatory diagram illustrating an output waveform of a Hall element in a case where the direction of detecting the magnetic field is set in the axial direction.

From the above, as shown in FIG. 6, the output of the Hall element 1 shows a level (indicated at 111) indicating the detection of the strong magnetic field in the case where the rotational position of the rotor 3 is that shown in FIG. 5C. In addition, when the rotational position of the rotor 3 is at the other positions, the output of the Hall element 1 shows a level (indicated at 112) which does not indicate the detection of the magnetic field.

The description of the first embodiment has been given above, and a description will be given hereafter of a second embodiment.

Figure 7A:
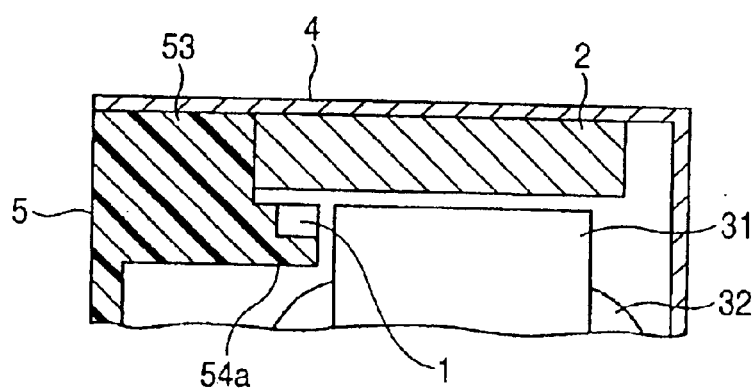
FIGS. 7A and 7B are explanatory diagrams illustrating the structure of a vicinity of the Hall element in a case where the direction of detecting the magnetic field is set in the circumferential direction.
Figure 7B:
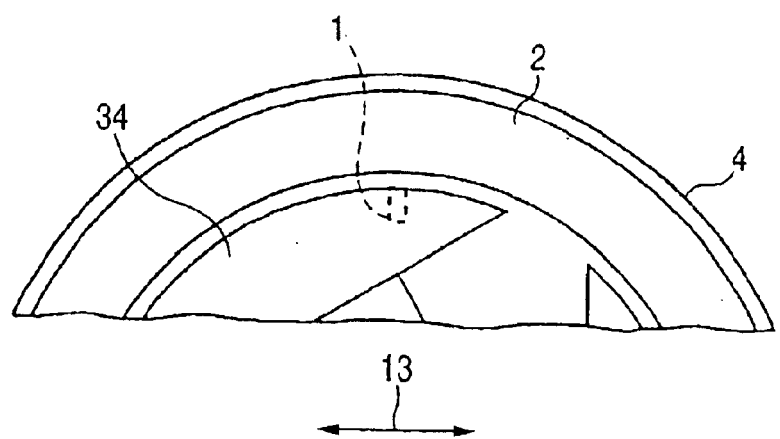

Differences between the second embodiment and the first embodiment lie only in the shape of a distal end of the projection 54 and its vicinity and in the direction in which the Hall element 1 is fitted. Namely, in the second embodiment, the Hall element 1 is provided at substantially the same position as in the first embodiment such that the detecting direction is set in the circumferential direction. Specifically, as shown in FIG. 7A, a Hall element 1 is attached to a projection 54a whose distal end and its vicinity are modified in shape, such that the direction of detecting the magnetic field is set in the direction indicated by arrow 13 in FIG. 7B (in FIG. 7A, in the direction perpendicular to the plane of the drawing).

A description will be given of the operation of the second embodiment configured as described above.

Figure 8A:
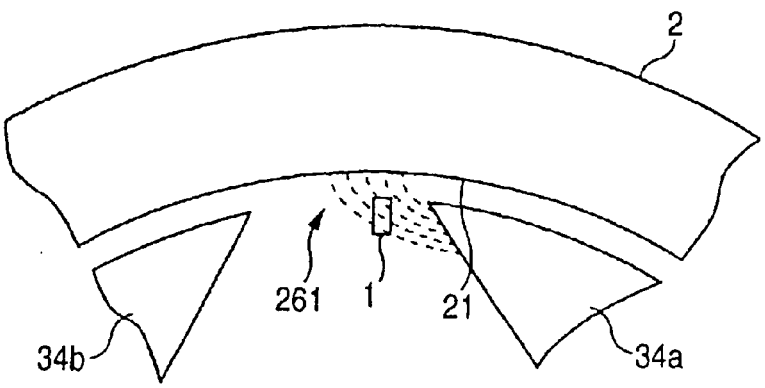
FIGS. 8A to 8C are explanatory diagrams illustrating the relationship between the rotational position of the rotor and the magnetic field in the vicinity of the Hall element.
Figure 8B:
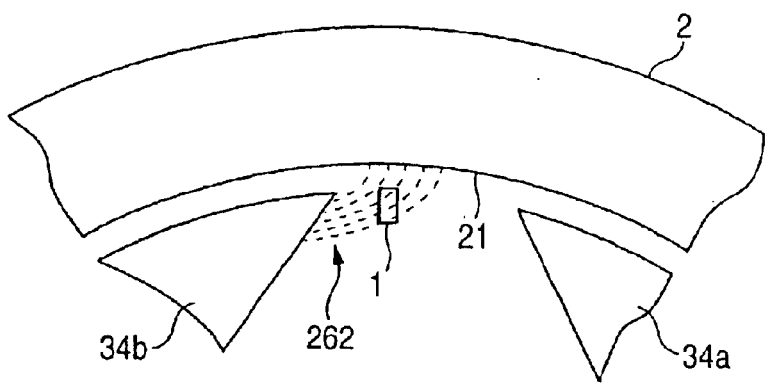
Figure 8C:
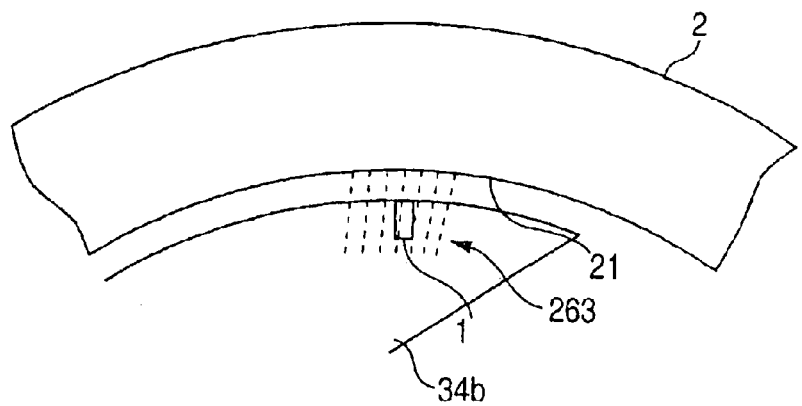

It is now assumed that the rotor 3 is rotating clockwise as viewed in FIGS. 8A to 8C. In a case where the rotational position of the rotor 3 is that shown in FIG. 8A, i.e., in a case where the arcuate portion 34a which passed a position located in the vicinity of the Hall element 1 is located closer to the Hall element 1 than the arcuate portion 34b, the magnetic field formed between the inner peripheral surface 21 of the jutting-out portion of the permanent magnet 2 and the arcuate portion 34a passes through the Hall element 1 (indicated at 261). Further, when the rotor 3 has rotated from the rotational position shown in FIG. 8A through a slight angle, the magnetic field formed between the inner peripheral surface 21 of the jutting-out portion of the permanent magnet 2 and the arcuate portion 34b passes through the Hall element 1 (indicated at 262), as shown in FIG. 8B. In other words, the direction in which the magnetic field passes through the Hall element 1 is inverted.

In addition, when the rotor 3 has further rotated, a magnetic field in which the direction of the magnetic lines of force is substantially perpendicular to the detecting direction of the Hall element 1 (indicated at 263) is formed. Accordingly, in this case, the magnetic field detected by the Hall element 1 remains at a very low level. Further, this state of detection of the very low level continues until a major portion of the arcuate portion 34b passes the position located in the vicinity of the Hall element 1. Then, immediately after the arcuate portion 34b passed the position located in the vicinity of the Hall element 1, the magnetic field formed between the permanent magnet 2 and the arcuate portion 34b indicates the form shown by 261 in FIG. 8A.

The output waveform of the Hall element 1 changes substantially (indicated at 121) during a brief period during which the rotor 3 rotates from the rotational position shown in FIG. 8A to the rotational position shown in FIG. 8B, and changes slowly during the remaining period (indicated at 122).

The description of the second embodiment has been given above, and a description will be given hereafter of a third embodiment.

Figure 10A:
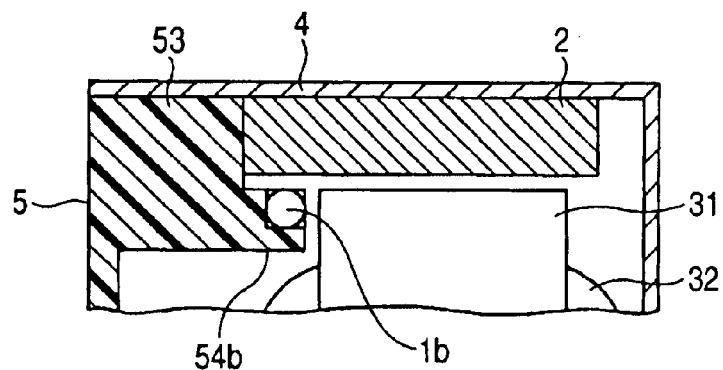
FIGS. 10A and 10B are explanatory diagrams illustrating the vicinity of a detection coil in a case where the detection coil is used as the magnetic sensor.
Figure 10B:
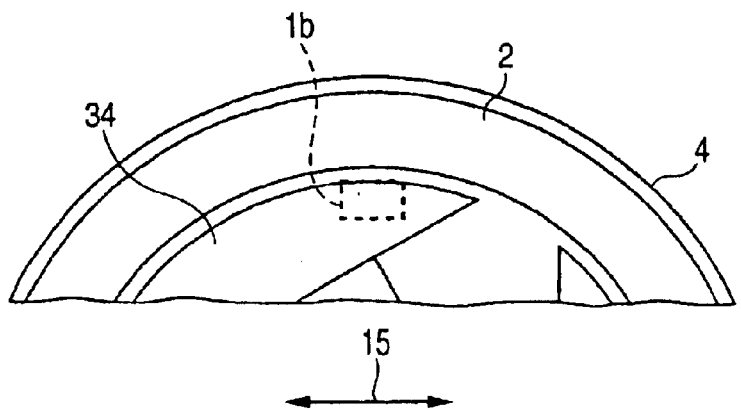

Differences between the third embodiment and the second embodiment lie in two aspects, i.e., that the magnetic sensor is changed from the Hall element 1 to a detection coil and that, in conjunction with this change, the shape of the distal end of the projection 54 and its vicinity is modified. Namely, in the third embodiment, the detection coil is provided at substantially the same position as the Hall element 1 of the second embodiment such that the detecting direction is set in the circumferential direction. Specifically, as shown in FIGS. 10A and 10B, a detection coil 1b is attached to a projection 54b whose distal end and its vicinity are modified in shape, such that the direction of detecting the magnetic field is set in the direction indicated by arrow 15 in FIG. 10B (in FIG. 10A, in the direction perpendicular to the plane of the drawing).

Figure 11:
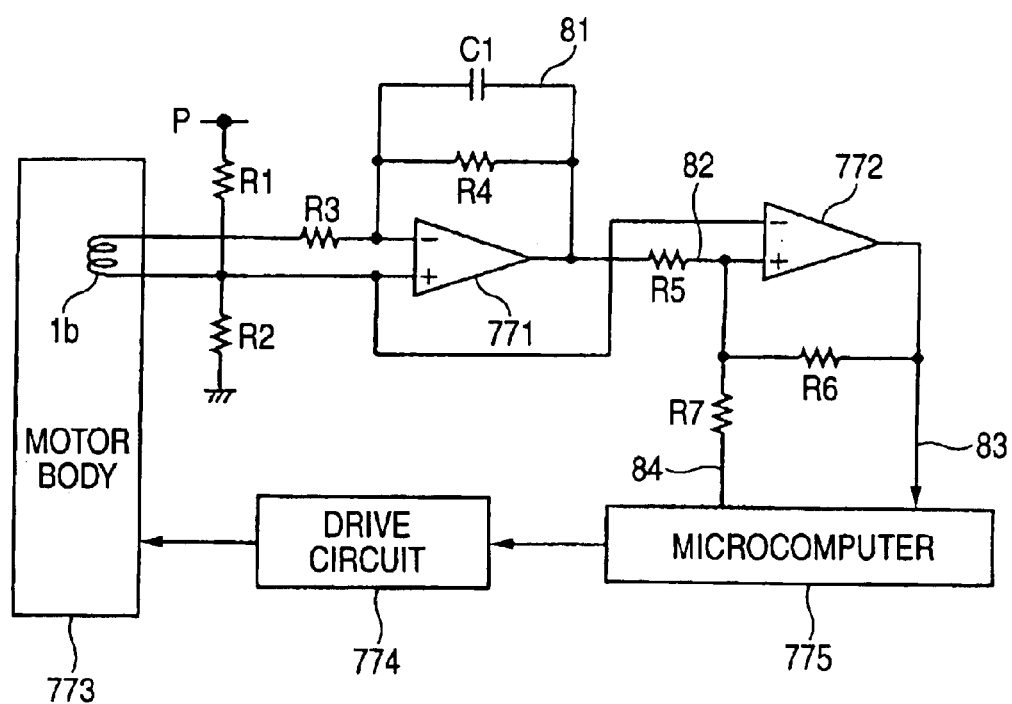
FIG. 11 is a circuit diagram illustrating an electrical configuration of a rotation control unit in the case where the detection coil is used as the magnetic sensor.

In addition, in the third embodiment, a waveform shaping circuit is used for generating accurate FG pulses with a simple circuit configuration without making the circuit configuration complex in both the forward rotation and reverse rotation of the rotor 3 on the basis of the output waveform produced due to the characteristics of the detection coil 1b. Referring to FIG. 11, a description will be given of a rotation control unit having this waveform shaping circuit.

A resistor R1 and a resistor R2 make up a voltage dividing circuit for dividing the voltage (5 V) of a plus power supply P in half. The voltage-divided output of 2.5 V is led as a reference voltage to a plus input of an OP amplifier 771 and a minus input of an OP amplifier 772. In addition, one terminal of the detection coil 1b is led to a minus input of the OP amplifier 771 through a resistor R3. The other terminal of the detection coil 1b is connected to the plus input of the OP amplifier 771. Further, a resistor R4 for setting the amplification factor of the OP amplifier 771 by forming a pair with the resistor R3 is connected between the minus input and the output of the OP amplifier 771. Furthermore, a capacitor C1 is connected in parallel with the resistor R4 so as to make the frequency characteristic of the OP amplifier 771 a low-pass characteristic.

The OP amplifier 772 is adapted to make a comparison between the voltage led to its plus input and a reference voltage by using the voltage (2.5 V) led to its minus input as the reference voltage. For this reason, the output of the OP amplifier 771 is led to the plus input of the OP amplifier 772 through a resistor R5. Further, a resistor R6 for imparting hysteresis to the OP amplifier 772 by forming a pair with the resistor R5 is connected between the plus input and the output of the OP amplifier 772. An output 84 of a microcomputer 775 is imparted to the plus input of the OP amplifier 772 through a resistor R7 so as to shift the overall output level of the OP amplifier 771 led through the resistor R5 in correspondence with the rotating direction of a motor body 773. Further, the output of the OP amplifier 772 is led to the microcomputer 775 as an FG signal 83.

In addition, an output of a drive circuit 774 is led to the motor body 773 having substantially the same configuration shown in FIG. 1 except the magnetic sensor (detection coil 1b). In addition, an output of a D/A converter incorporated in the microcomputer 775 is led to the drive circuit 774. Namely, the microcomputer 775 provides control for rotating the motor body 773 at a predetermined speed by changing the dc voltage to be supplied to the drive circuit 774 on the basis of the FG signal 83.

Figure 12:
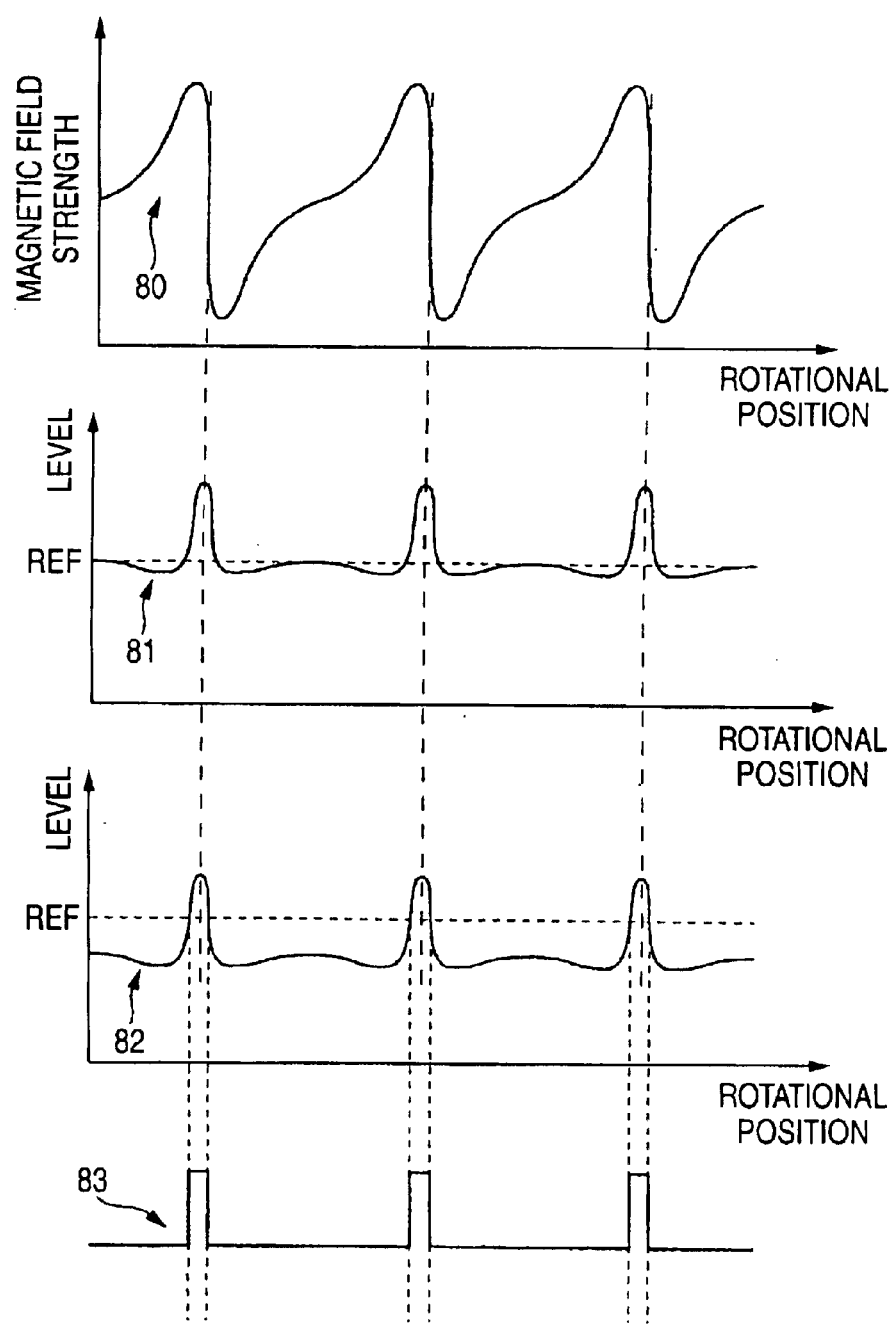
FIG. 12 is an explanatory diagram illustrating waveforms of principal signals of the rotation control unit.

Referring to FIG. 12, a description will be given of the operation of the third embodiment configured as described above.

Figure 9:
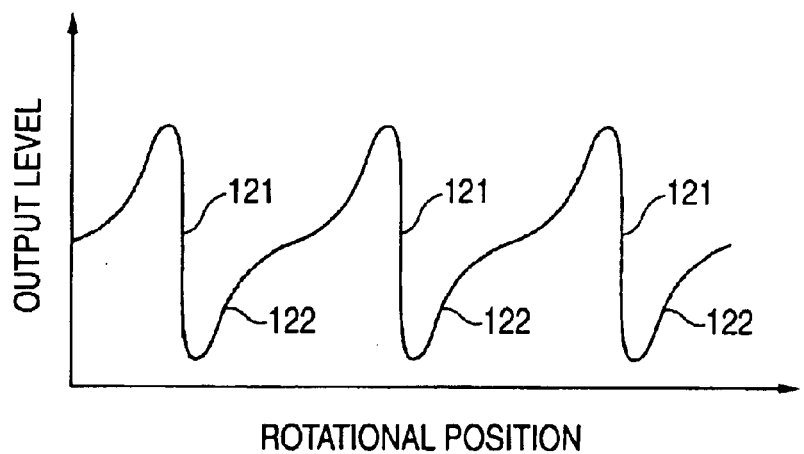
FIG. 9 is an explanatory diagram illustrating the output waveform of the Hall element in the case where the direction of detecting the magnetic field is set in the circumferential direction.

It is now assumed that the rotor 3 is rotating clockwise as viewed in FIG. 10. The detection coil 1b sends an output indicating the speed of change of the magnetic field as its characteristic. Meanwhile, the change of the magnetic field along the detecting direction 15 in the vicinity of the detection coil 1b is the one shown in FIG. 9 (waveform 80 in FIG. 12 shows again the change shown in FIG. 9), as described in the second embodiment. Accordingly, the output of the detection coil 1b is a waveform 81 in which a differentiated waveform of the waveform 80 is inverted and amplified. It should be noted that this waveform 81 is one whose major portions change in a voltage range higher than the reference voltage ref of 2.5 V.

Meanwhile, the reference voltage ref also serves as the voltage used as a reference for comparison by the OP amplifier 772 making up the comparator so as to simplify the circuit configuration. For this reason, in the case where the motor body 773 is rotated in the forward direction, the microcomputer 775 causes the output 81 of the OP amplifier 771 to shift to a lower side by setting the output 84 to a low level L. Consequently, the signal waveform which is led to the plus input of the OP amplifier 772 assumes the waveform shown at 82. Accordingly, the FG signal 83, in which the signal led to the plus input of the OP amplifier 772 assumes the H level during the period when it is higher than the reference voltage ref, is sent from the output of the OP amplifier 772.

Figure 13:
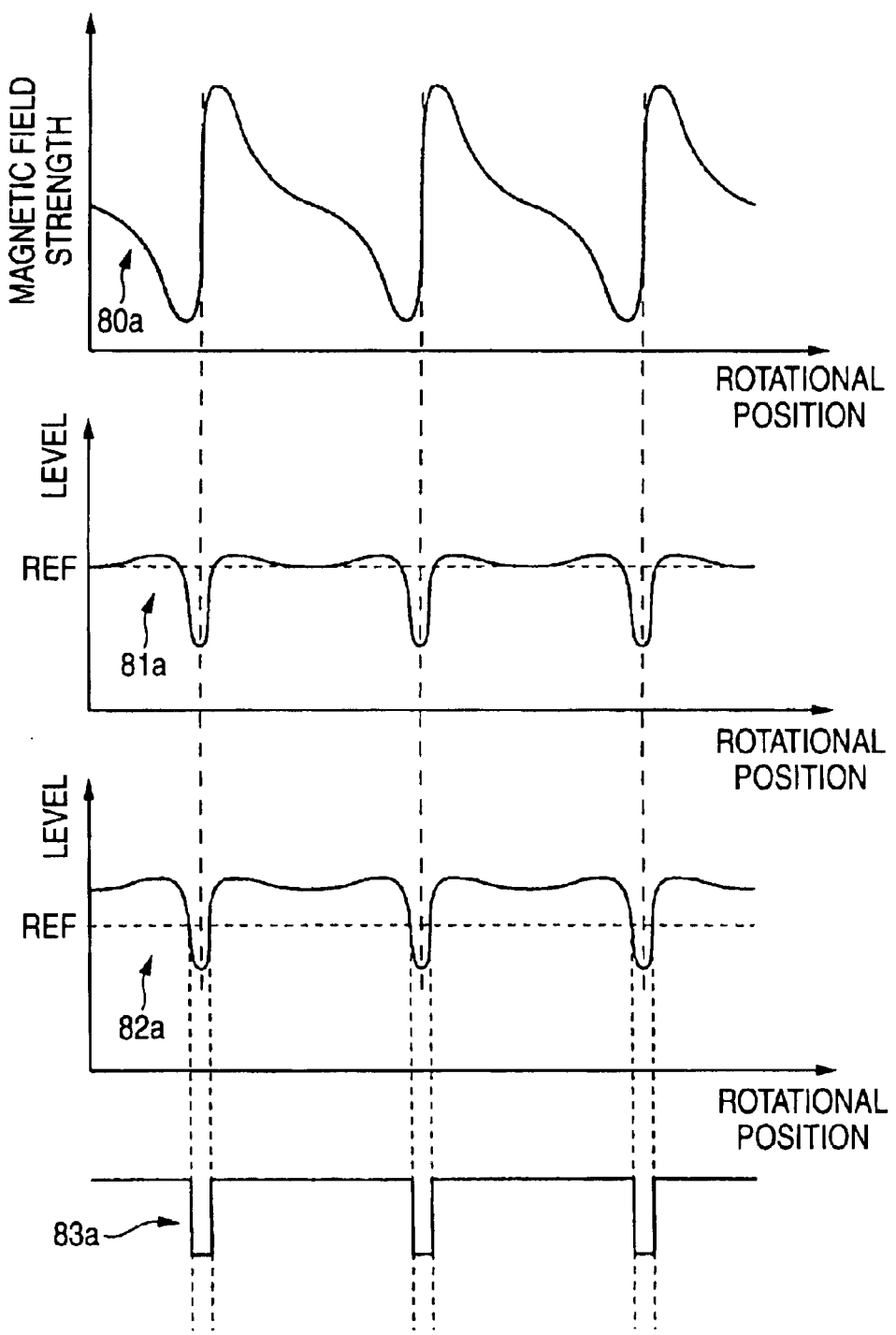
FIG. 13 is an explanatory diagram illustrating waveforms of principal signals of the rotation control unit.
Figure 14:
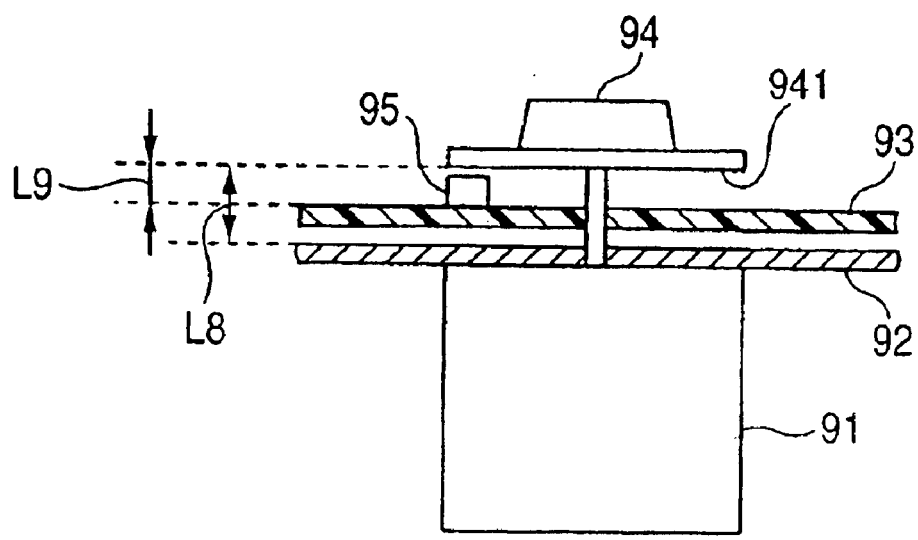
FIG. 14 is an explanatory diagram illustrating an FG signal generating means of the prior art.

On the other hand, in a case where the microcomputer 775 rotates the motor body 773 in the reverse direction, the magnetic field in the vicinity of the detection coil 1b shows a change in which the waveform 80 shown in FIG. 12 is inverted (shown at 80a in FIG. 13). For this reason, the signal of a waveform shown at 81a in FIG. 13 is outputted from the output of the OP amplifier 771. It should be noted that major portions of this waveform 81a change in a voltage range lower than the reference voltage ref of 2.5 V.

Meanwhile, the voltage serving as the reference for comparison by the OP amplifier 772 making up the comparator is the reference voltage ref, as already described. For this reason, in the case where the motor body 773 is rotated in the reverse direction, the microcomputer 775 shifts the output 81 of the OP amplifier 771 to the higher side by setting the output 84 at the H level. Consequently, the signal waveform led to the plus input of the OP amplifier 772 assumes a waveform shown at 82a. Accordingly, an FG signal 83a, in which the signal led to the plus input of the OP amplifier 772 assumes the L level during the period when it is lower than the reference voltage ref, is sent from the output of the OP amplifier 772.

It should be noted that the invention is not limited to the above-described embodiments. Although, as for the magnetic sensor, the description has been given of the Hall element and the detection coil, the magnetic sensor may be configured by using, for example, a magneto-resistance device or the like.

In addition, although a description has been given of the case in which the invention is applied to the two-pole, three-slot brush motor, the invention may be similarly applied to brush motors having other numbers of poles and slots as well.

As described above, in the invention, a Hall element is provided for detecting a change in the field magnet of the field system occurring in correspondence with a change in the rotational position of the rotor core. Further, the stator is formed by an annular permanent magnet whose inner peripheral surface opposes an outer peripheral surface of the rotor core. Further, a circumferentially attaching position of the Hall element is set in the vicinity of a central position of a magnetic pole of the permanent magnet. Further, the axial length of the permanent magnet is formed to be longer than that of the rotor core. Further, the permanent magnet is made to jut out from an axial end face of the rotor core on a side where the commutator is fitted. Furthermore, the attaching position of the Hall element is set on an inner peripheral side of the jutting-out portion. Namely, the change in the field magnet due to the rotation of the rotor is detected by the Hall element. Further, the attaching position of the Hall element is set at a position where the degree of change in the magnetic field is extremely large. In addition, in a case where the Hall element is formed as a chip component, the Hall element can be easily attached even in a narrow space. For this reason, it is possible to generate an FG signal without making the shape large and the structure complex, increase the output level of the magnetic sensor for generating the FG signal, and facilitate the mounting of the magnetic sensor even when the output level is increased.

Further, in the invention, the magnetic sensor is provided for detecting a change in the field magnet which occurs in correspondence with a change in the rotational position of the rotor core. Accordingly, since a signal indicating the rotational speed of the rotor can be obtained by merely adding the magnetic sensor, it is possible to generate the FG signal without making the shape large and the structure complex.

Still further, the circumferentially attaching position of the magnetic sensor is set in the vicinity of a central position of the magnetic pole of an annular permanent magnet. Accordingly, since the degree of change in the field magnet occurring due to the rotation of the rotor is large in the position where the magnetic sensor is attached, it is possible to increase the output level of the magnetic sensor.

Furthermore, the permanent magnet is made to jut out from an axial end face of the rotor core on a side where the commutator is fitted, and the attaching position of the magnetic sensor is set on an inner peripheral side of the jutting-out portion. Accordingly, since the degree of change in the field magnet occurring due to the rotation of the rotor is extremely large in the position where the magnetic sensor is attached, it is possible to further increase the output level of the magnetic sensor.

Furthermore, a detection coil is used as the magnetic sensor. Therefore, it is possible to make the magnetic sensor inexpensive.

What is claimed is:

1. A brush motor comprising:

a stator having a permanent magnet for forming a field magnet;

a rotor in which rotor windings are wound around a rotor core;

feeding brushes;

a commutator through which a current is supplied to the rotor windings, the commutator sliding on the feeding brushes; and a Hall element provided for detecting a change in the field magnet occurring in correspondence with a change in the rotational position of the rotor core, wherein the permanent magnet is formed into an annular shape whose inner peripheral surface opposes an outer peripheral surface of the rotor core, a circumferentially attaching position of the Hall element is set in the vicinity of a central position of a magnetic pole of the permanent magnet, an axial length of the permanent magnet is set to be longer than that of the rotor core, the permanent magnet is made to jut out from an axial end face of the rotor core on a side where the commutator is disposed, and the attaching position of the Hall element is set on an inner peripheral side of the jutting-out portion.

2. A brush motor comprising:

a stator having a permanent magnet for forming a field magnet;

a rotor in which rotor windings are wound around a rotor core;

feeding brushes;

a commutator through which a current is supplied to the rotor windings, the commutator sliding on the feeding brushes; and a magnetic sensor, disposed on a casing side, provided for detecting a change in the field magnet occurring in correspondence with a change in the rotational position of the rotor core.

3. A brush motor comprising:

a stator having a permanent magnet for forming a field magnet;

a rotor in which rotor windings are wound around a rotor core;

feeding brushes;

a commutator through which a current is supplied to the rotor windings, the commutator sliding on the feeding brushes; and a magnetic sensor provided for detecting a change in the field magnet occurring in correspondence with a change in the rotational position of the rotor core, wherein the permanent magnet is formed into an annular shape whose inner peripheral surface opposes an outer peripheral surface of the rotor core, and a circumferentially attaching position of the magnetic sensor is set in the vicinity of a central position of a magnetic pole of the permanent magnet.

4. The brush motor according to claim 3, wherein an axial length of the permanent magnet is set to be longer than that of the rotor core, the permanent magnet is made to jut out from an axial end face of the rotor core on a side where the commutator is disposed, and the attaching position of the magnetic sensor is set on an inner peripheral side of the jutting-out portion.

5. The brush motor according to claim 4, wherein a detection coil is used as the magnetic sensor.

* * * * *